3,031,500
CONVERSION OF AMMONIUM SALTS
Edward James Gasson, and David James Hadley, Epsom Downs, and Barrie Wood, Epsom, England, assignors to The Distillers Company Limited, Edinburgh, Scotland, a British company
No Drawing. Filed Mar. 27, 1957, Ser. No. 648,785
Claims priority, application Great Britain April 20, 1956
7 Claims. (Cl. 260—515)

The present invention relates to the production of isophthalic and/or terephthalic acids, and in particular to the conversion of the ammonium salts of these acids to the free acids.

The conventional method of producing a carboxylic acid from its ammonium salt consists in treating an aqueous solution of the salt with at least the stoichiometrical equivalent of a strong acid such as sulphuric acid and filtering off and washing the organic acid thereby precipitated. This method is not attractive for use on an industrial scale owing to the high cost of sulphuric acid, and because the ammonia and the sulphuric acid cannot be economically recovered from the ammonium sulphate produced.

It is an object of the present invention to provide an improved process for the production of aromatic carboxylic acids from their ammonium salts in very high yields, which does not involve the use of sulphuric acid, and in which the ammonia is recovered in an uncombined state. Such ammonium salts may, for example, be produced in accordance with the process described in application Serial No. 609,352, filed September 12, 1956, now Patent No. 2,979,526.

According to the present invention, the process for the production of isophthalic and/or terephthalic acids comprises heating ammonium isophthalate and/or ammonium terephthalate to a temperature at which ammonia is evolved and continuously removing the liberated ammonia.

The ammonium salt may be present in the form of a dry solid, which is preferably powdered, and which should be agitated during the reaction by mechanical means, or by passing an inert gas, such as hydrogen, nitrogen, carbon dioxide or steam through the powder. Alternatively, the ammonium salt may be suspended in an inert liquid, such as kerosene or diisopropylbenzene, or dissolved in an inert solvent or partial solvent, such as water.

The reaction can be carried out over a moderately wide range of temperatures. In general the lowest practical temperature is about 120° C., since below this temperature the ammonia evolution is usually very slow. The upper limit of the temperature range is that at which substantial decomposition of the acid sets in. It is preferred to use temperatures between about 140° and 250° C. The heating is discontinued when the stoichiometrical amount of ammonia, which can be estimated by conventional methods, has been evolved.

The liberated ammonia is continuously removed from the reaction, preferably by passing an inert gas such as hydrogen, nitrogen, carbon dioxide or steam through the reaction mass. In a preferred embodiment of the invention, the reaction is carried out in the presence of a volatile inert liquid such as water, and the vapour from this function as an inert carrier gas to remove the liberated ammonia.

The reaction may be carried out at atmospheric pressure, or at increased or reduced pressures. When the reaction is carried out in the presence of a relatively low-boiling liquid, such as water, it may be particularly desirable to use super-atmospheric pressures in order to increase the temperature and thereby the rate of reaction to a practical figure.

The following examples are given further to illustrate the process of the invention. In the examples, the parts by weight and parts by volume bear the same relation to each other as do kilograms to litres.

*Example 1*

Through 2 parts by weight of powdered diammonium isophthalate contained in a flask fitted with a reflux condenser and heated by an oil bath at 180° C. was passed 2,000 parts by volume per hour of nitrogen. The issuing gas was scrubbed free of ammonia which was estimated at regular intervals. After three hours, during which the temperature of the flask contents rose gradually from 100–155° C., 99.5% of the equivalent ammonia had been collected. The residue in the flask had an equivalent weight of 82.4; theoretical for isophthalic acid 83.05.

The experiment was repeated with the addition of 25 parts by volume diisopropylbenzene to the diammonium isophthalate and with the oil bath temperature at 196° C. 99.5% of the equivalent ammonia was collected in 5 hours and 40 minutes. In both cases the yield of isophthalic acid was substantially theoretical.

*Example 2*

Diammonium terephthalate was decomposed by the method indicated in Example 1. The decomposition to ammonia and terephthalic acid was substantially complete in 22 hours, a substantially theoretical yield of terephthalic acid being obtained.

*Example 3*

A slow stream of nitrogen was passed through a mixture of 2 parts by weight of diammonium terephthalate and 20 parts by volume of paraffin, the temperature of which was gradually raised over a period of about 6 hours to 180° C. 99.5% of the equivalent ammonia was evolved.

The mixture was cooled and filtered, and the precipitate, after being dried, was substantially pure isophthalic acid in substantially theoretical yield.

*Example 4*

Through a solution of 2 parts by weight of diammonium isophathalate in 25 parts by volume of water heated to the boiling point under reflux was passed 2,000 parts by volume per hour of nitrogen. After 22 hours 12.5% of the equivalent ammonia had been collected.

This example shows that while the reaction takes place at temperature of the order of 100° C., the rate of reaction is slow.

The acids produced by the process of the present invention are particularly valuable intermediates in the production of esters, alkyd and polyester resins, and other important chemical compounds. For instance, terephthalic acid may be converted to the fibre-forming linear polyester, polyethylene terephthalate, well known under the trade names "Terylene" and "Dacron."

We claim:
1. The process for the production of an aromatic carboxylic acid which comprises heating a material selected from the group consisting of diammonium isophthalate and diammonium terephthalate to a temperature above 120° C. at which ammonia is evolved and continuously removing the liberated ammonia.
2. The process as claimed in claim 1 wherein the diammonium salt is suspended in an inert liquid.
3. The process as claimed in claim 1 wherein the diammonium salt is dissolved in a solvent.
4. The process as claimed in claim 1 wherein the liber- ated ammonia is continuously removed by passing an inert gas through the reaction mass.

5. The process as claimed in claim 4 wherein the reaction is carried out in the presence of water, and the water vapour functions as the inert carrier gas to remove the liberated ammonia.

6. The process as claimed in claim 1 wherein the reactions carried out at a temperature in the range of about 140°–250° C.

7. Process for the preparation of an acid selected from the group consisting of isophthalic acid and terephthalic acid which comprises heating a material selected from the group consisting of diammonium isophthalate and diammonium terephthalate to a temperature at which ammonia is evolved and continuously removing the liberated ammonia.

References Cited in the file of this patent

UNITED STATES PATENTS

| | | |
|---|---|---|
| 2,209,314 | Baker | July 30, 1940 |
| 2,664,440 | Toland | Dec. 29, 1953 |
| 2,723,995 | Rutherford | Nov. 15, 1955 |
| 2,734,079 | Aroyan et al. | Feb. 7, 1956 |
| 2,734,080 | Aroyan et al. | Feb. 7, 1956 |
| 2,824,893 | Toland | Feb. 25, 1958 |